(12) United States Patent
Shmidt et al.

(10) Patent No.: US 11,103,830 B2
(45) Date of Patent: Aug. 31, 2021

(54) METHOD FOR PURIFYING A LIQUID

(71) Applicant: Electrophor Inc., Woodmere, NY (US)

(72) Inventors: Joseph Lvovich Shmidt, Woodmere, NY (US); Sergej Victorovich Smirnov, St. Petersburg (RU); Vadim Nikolaevich Knizel, St. Petersburg (RU)

(73) Assignee: ELECTROPHOR, INC., Woodmere, NY (US)

( * ) Notice: Subject to any disclaimer, the term of this patent is extended or adjusted under 35 U.S.C. 154(b) by 635 days.

(21) Appl. No.: 15/757,024

(22) PCT Filed: Jul. 21, 2016

(86) PCT No.: PCT/RU2016/000464
§ 371 (c)(1),
(2) Date: Jul. 24, 2018

(87) PCT Pub. No.: WO2017/039484
PCT Pub. Date: Mar. 9, 2017

(65) Prior Publication Data
US 2018/0345220 A1    Dec. 6, 2018

(30) Foreign Application Priority Data
Sep. 2, 2015   (RU) ................................ 2015137551

(51) Int. Cl.
*B01D 61/12*   (2006.01)
*B01D 65/02*   (2006.01)
(Continued)

(52) U.S. Cl.
CPC .......... *B01D 61/12* (2013.01); *B01D 61/025* (2013.01); *B01D 61/08* (2013.01); *B01D 65/02* (2013.01);
(Continued)

(58) Field of Classification Search
CPC ...... B01D 61/12; B01D 61/025; B01D 61/08; B01D 2311/25; B01D 2321/10;
(Continued)

(56) References Cited

U.S. PATENT DOCUMENTS 2,910,836 A   11/1959   Karrer
3,493,496 A    2/1970   Bray
(Continued)

FOREIGN PATENT DOCUMENTS

CN     101732901    6/2010
CN     107108267    8/2017
(Continued)

OTHER PUBLICATIONS

International Search Report for PCT/RU2015/000522 dated Dec. 24, 2015, 2 pages.
(Continued)

*Primary Examiner* — Terry K Cecil
(74) *Attorney, Agent, or Firm* — Fitch, Even, Tabin & Flannery LLP

(57) ABSTRACT

Raw liquid is fed along a raw liquid and drain liquid mixing line to a liquid purification device. Drain liquid is fed along a recirculation line to be mixed with raw liquid. After a set period of time, the liquid purification process is interrupted to flush the liquid purification device by a liquid to remove contaminants built up on the inside surface of the liquid purification device. Downstream of the liquid purification device, the liquid is discharged at high speed into a drain. Prior to flushing, the purification process is interrupted at least once for a time sufficient to enable disruption of a polarized layer of contaminants. A mixture of raw liquid and drain liquid is used as the liquid medium for flushing such that less raw liquid is used for flushing and the service life of the water purification device increases.

7 Claims, 3 Drawing Sheets

(51) Int. Cl.
  *B01D 61/02* (2006.01)
  *B01D 61/08* (2006.01)
  *C02F 1/44* (2006.01)
  *C02F 103/08* (2006.01)

(52) U.S. Cl.
  CPC .......... *C02F 1/441* (2013.01); *B01D 2311/25* (2013.01); *B01D 2313/50* (2013.01); *B01D 2315/12* (2013.01); *B01D 2315/20* (2013.01); *B01D 2321/02* (2013.01); *B01D 2321/10* (2013.01); *B01D 2321/14* (2013.01); *C02F 2103/08* (2013.01); *C02F 2209/003* (2013.01); *C02F 2209/40* (2013.01); *C02F 2303/16* (2013.01); *Y02A 20/131* (2018.01)

(58) Field of Classification Search
  CPC .............. B01D 65/02; B01D 2311/04; B01D 2311/12; B01D 2313/50; B01D 2315/12; B01D 2315/20; B01D 2321/02; B01D 2321/14; B01D 61/022; B01D 61/04; B01D 61/10; B01D 61/14; B01D 61/22; C02F 1/441; C02F 2103/08; C02F 2209/003; C02F 2209/40; C02F 2303/16; Y02A 20/131
  See application file for complete search history.

(56) References Cited

U.S. PATENT DOCUMENTS

| | | |
|---|---|---|
| 3,794,172 A | 2/1974 | Bray |
| 4,086,166 A | 4/1978 | Martin |
| 4,176,063 A | 11/1979 | Tyler |
| 4,243,523 A | 1/1981 | Pelmulder |
| 4,626,346 A | 12/1986 | Hall |
| 4,833,888 A | 5/1989 | Kerner |
| 4,891,594 A | 1/1990 | Wilfley |
| 4,973,404 A | 11/1990 | Weber |
| 4,981,594 A | 1/1991 | Jones |
| 4,983,301 A | 1/1991 | Szucz |
| 4,997,553 A | 3/1991 | Clack |
| 5,049,272 A | 9/1991 | Nieweg |
| 5,266,203 A | 11/1993 | Mukhopadhyay |
| 5,503,735 A | 4/1996 | Vinas |
| 6,068,764 A | 5/2000 | Chau |
| 6,093,312 A | 7/2000 | Boulter |
| 6,103,125 A | 8/2000 | Kuepper |
| 6,162,361 A | 12/2000 | Adiga |
| 6,190,558 B1 | 2/2001 | Robbins |
| 6,290,856 B1 | 9/2001 | Beall |
| 7,285,210 B2 | 10/2007 | Schmitt |
| 7,338,595 B2 | 3/2008 | Vannewenhizen |
| 7,601,256 B2 | 10/2009 | Beall |
| 7,628,921 B2 | 12/2009 | Efraty |
| 9,550,150 B2 | 1/2017 | Smirnov |
| 2002/0100716 A1 | 8/2002 | Bosko |
| 2005/0023198 A1 | 2/2005 | Halemba |
| 2007/0151925 A1 | 7/2007 | De Los Reyes |
| 2009/0113898 A1 | 5/2009 | Kirol |
| 2009/0152197 A1 | 6/2009 | Lilas |
| 2010/0018220 A1 | 1/2010 | Modad |
| 2011/0180465 A1 | 7/2011 | Richetti |
| 2011/0198275 A1 | 8/2011 | Hayes |
| 2011/0303660 A1 | 12/2011 | Yang |
| 2012/0048790 A1 | 3/2012 | Voelker |
| 2012/0168368 A1 | 7/2012 | De Los Reyes |
| 2012/0234739 A1 | 9/2012 | Smirnov |
| 2013/0334115 A1 | 12/2013 | Voelker |
| 2014/0061129 A1 | 3/2014 | Hoz |
| 2014/0110337 A1 | 4/2014 | Hoz |

FOREIGN PATENT DOCUMENTS

| | | |
|---|---|---|
| CN | 107250063 | 10/2017 |
| CN | 108473341 | 8/2018 |
| CN | 108473342 | 8/2018 |
| DE | 102006015675 | 10/2007 |
| DE | 202011000680 | 9/2011 |
| DE | 16842406 | 11/2018 |
| DE | 16842407 | 11/2018 |
| EP | 0479492 | 4/1992 |
| EP | 1183212 | 3/2002 |
| EP | 3241807 | 11/2017 |
| EP | 3345871 | 7/2018 |
| EP | 3345872 | 7/2018 |
| FR | 2940764 | 7/2010 |
| RU | 2004233 | 12/1993 |
| RU | 2047330 | 11/1995 |
| RU | 2100295 | 12/1997 |
| RU | 20256 | 10/2001 |
| RU | 22434 | 4/2002 |
| RU | 2199377 | 2/2003 |
| RU | 2287490 | 11/2006 |
| RU | 2297389 | 4/2007 |
| RU | 2363663 | 9/2007 |
| RU | 2006105261 | 9/2007 |
| RU | 2331586 | 11/2007 |
| RU | 2323036 | 1/2008 |
| RU | 2006121054 | 1/2008 |
| RU | 2323766 | 5/2008 |
| RU | 74909 | 7/2008 |
| RU | 89097 | 11/2009 |
| RU | 2421270 | 4/2011 |
| RU | 2473472 | 1/2013 |
| RU | 2484884 | 6/2013 |
| RU | 2494971 | 10/2013 |
| RU | 2531392 | 10/2014 |
| RU | 2614705 | 3/2017 |
| RU | 2015137550 | 3/2017 |
| SU | 1764094 | 9/1992 |
| WO | 8502783 | 7/1985 |
| WO | 9947226 | 9/1999 |
| WO | 0076639 | 12/2000 |
| WO | 02055182 | 7/2002 |
| WO | 2002055182 | 7/2002 |
| WO | 2010122336 | 10/2010 |
| WO | 2011110585 | 9/2011 |
| WO | 2012112045 | 8/2012 |
| WO | 2015083717 | 6/2015 |
| WO | 2015121821 | 8/2015 |
| WO | 2016108733 | 7/2016 |
| WO | 2017039485 | 3/2017 |

OTHER PUBLICATIONS

International Search Report for PCT/RU2015/000890 dated Apr. 21, 2016, 1 page.
Supplemental European Search Report and Written Opinion for EP15875786 dated May 16, 2018; 7 pages.
WO2015121821; EPO Machine Translation (Year: 2020).
FR2940764A 1—EPO Machine Translation (Year: 2020).
International Search Report for PCT/RU2016/000466 dated Jan. 12, 2017; 1 page.
International Search Report for PCT/RU2016/000464 dated Jan. 19, 2017; 1 page.
International Extended Search Report in International Application No. PCT/RU2015/000890 dated May 25, 2018; 6 pages.
International Report on Patentability in corresponding International Application No. PCT/RU2015/000890 dated Jul. 18, 2017; 6 pages.
Supplemental European Search Report for EP15807541 dated Feb. 15, 2018; 2 pages.
Supplemental European Search Report for EP3214046 dated May 16, 2018; 2 pages.
Written Opinion of the International Searching Authority for EP15807541 dated Feb. 15, 2018; 5 pages.
Written Opinion of the International Searching Authority for EP3214046 dated May 16, 2018; 5 pages.
Written Opinion of the International Searching Authority for PCT/RU2015/000216 dated Aug. 13, 2015; 6 pages.
Provisional Opinion and Partial Search Report for EP3345871, dated Apr. 16, 2019; 11 pages.

(56) References Cited

OTHER PUBLICATIONS

International Prelminary Report on Patentability and Written Opinion of the International Search Authority for PCT/RU2016/000466 dated Mar. 6, 2018; 5 pages.
European Search Opinion for EP3345872, dated Mar. 29, 2019; 4 pages.
International Search Report in corresponding International Application No. PCT/RU2015/000216, dated Aug. 13, 2015, 3 pages.
International Report on Patentability in corresponding International Application No. PCT/RU2015/000216, dated Jul. 8, 2015, 6 pages.
International Search Report for PCT/RU2019/000309 dated Aug. 13, 2019; 2 pages.

METHOD FOR PURIFYING A LIQUID

CROSS REFERENCE TO RELATED APPLICATIONS

This patent application is the national phase of PCT/RU2016/000464 filed Jul. 21, 2016, which claims the benefit of Russian Patent Application No. 2015137551 filed Sep. 2, 2015.

TECHNICAL FIELD

The invention relates to a method for purification and/or desalination of liquid, mostly water, which can be used in domestic and/or drinking water supply in residential and/or industrial environment, summer cottages and garden plots.

BACKGROUND

Methods of reverse osmosis treatment of liquids involving recycling and systems for implementing the same are quite widely spread.

A conventional liquid purification method can be implemented in a liquid purification system disclosed in U.S. Pat. No. 6,190,558 (B01D 61/00, Nimbus Water Systems, Inc., US, publ. Feb. 20, 2001). The liquid purification method comprises at least one automatically initiated filtration cycle involving purification of raw liquid and flushing of liquid purification means with liquid medium, wherein in the course of the cycle the raw liquid is routed to a liquid purification unit through a raw liquid feed line. In the liquid purification unit, the raw liquid is supplied into a mixing device connected to the raw liquid feed line and to a raw liquid/drain liquid mixture supply line, and further, through a pressure increasing means, to a liquid purification means; after the liquid purification means the purified liquid enters a purified liquid line wherefrom the purified liquid is supplied to consumer. Drain liquid is supplied through a recirculation line to a mixing device, such as a mixer, and further through a raw liquid/drain liquid mixture supply line via the pressure increasing means the resulting raw liquid/drain liquid mixture is routed into the liquid purification means, while a portion of the drain liquid is continuously discharged via a restrictor into drain through the drain liquid line.

The raw liquid/purified liquid mixture is used as the liquid medium in flushing of the liquid purification means. Flushing of the liquid purification means is performed in the following manner. The liquid purification system comprises a purified liquid recycling line having an inlet connected to the purified liquid line and an outlet connected to the mixing device. Purified liquid is fed through the purified liquid recycling line to the mixing device, where the purified liquid is mixed with raw liquid. After the mixing device, the resulting raw liquid/purified liquid mixture is supplied through the pressure increasing means into the liquid purification means. Then, purified liquid is supplied to the purified liquid line, and drain liquid with a lower concentration is discharged into drain. Upon reaching a predetermined reduced concentration of contaminants in the drain fluid leaving the liquid purification means, the flushing process is terminated.

The liquid purification method involves flushing the liquid purification means with a raw liquid/purified liquid mixture. During the flushing process the liquid purification process is not interrupted, and the produced purified liquid is routed to be mixed with raw liquid through the purified liquid supply line; in so doing the concentration of contaminants in the liquid passing through the liquid purification means decreases. The resulting purified liquid is not routed to consumption, but is spent to flush the operating liquid purification means.

Since the flushing described above is performed periodically, the contamination layer will compact and solidify with time, substantially impairing the performance of the liquid purification means, therefore, a longer time and a larger amount of the raw liquid/purified liquid mixture will be required to break and remove the contamination layer.

In light of the foregoing, the liquid purification method comprising flushing of purification means with a raw liquid/purified liquid mixture, which is accomplished at operating liquid purification means, is not quite effective due to the high consumption of purified and raw liquid.

Another liquid purification method can be implemented in a liquid purification system disclosed in U.S. Pat. No. 7,628,921 (002F/44, Avi Efraty, Israel, publ. Aug. 12, 2009). The liquid purification method comprises at least one automatically initiated liquid purification cycle involving purification of raw liquid and flushing of liquid purification means with a liquid medium, followed by resuming the purification of liquid; wherein in the course of the cycle, raw liquid is routed through a raw liquid feed line to a liquid purification unit, in which the raw liquid is supplied into a liquid purification means through a pressure increasing means; after the liquid purification means the purified liquid enters a purified liquid line. Drain liquid is supplied through a recirculation line, via a liquid velocity increasing means, through a raw liquid/drain liquid mixing line to the liquid purification means. Purified liquid is fed to consumption through the purified liquid line. The amount of purified liquid supplied to the consumer is replaced by the equivalent amount of raw liquid. In the liquid purification system, a pressure flow-through tank is connected to the recirculation line via a valve. The pressure flow-through tank is connected, via a valve, to a secondary raw liquid feed line connected to the raw liquid feed line upstream of the pressure increasing means. During purification process, the pressure tank is disconnected from the recirculation line and from the secondary raw liquid feed line.

Upon a predetermined time of liquid purification, during which drain liquid is concentrated, the valve on the recirculation line is opened. Concentrated drain liquid is supplied to the pressure flow-through tank. At the same time, raw liquid is supplied to the liquid purification means through the raw liquid feed line, via the pressure increasing means, in the amount that replaces the entire amount of the concentrated drain liquid, while the liquid purification means is flushed with raw liquid. Once the entire concentrated drain liquid from the liquid purification means enters the pressure tank, the tank is again disconnected from the recirculation line. The liquid purification process is resumed. Raw liquid is fed to the pressure tank through the secondary raw liquid feed line. The raw liquid replacing the concentrated drain liquid in the pressure flow tank is discharged into drain through the drain discharge line, via the drain discharge valve open. Once the concentrated drain liquid is completely removed from the system, the valve on the recirculation line opens, the valve on the secondary raw liquid feed line closes, and raw liquid fills the system. Liquid purification process is resumed.

The liquid purification method described in U.S. Pat. No. 7,628,921, publ. Aug. 12, 2009 (C02F/44, Avi Efraty, Israel) has a serious drawback. During one liquid purification cycle, excess volume of raw liquid is used to replace the concentrated drain liquid in the liquid purification means, and to replace the concentrated drain liquid in the pressure flow-through tank. Furthermore, in the course of liquid purification, since the concentration of contaminants in drain liquid is constantly increasing, a layer of contaminants built up on the inside surface of the membrane is also growing; this layer thickens and solidifies, thereby reducing the life of the liquid purification means.

Another liquid purification method is provided in a liquid purification system disclosed in U.S. Pat. No. 5,503,735 (B01 D 61/12, Water Factory Systems, US, publ. Feb. 4, 1996). The liquid purification method comprises at least one automatically initiated liquid purification cycle involving purification of raw liquid and flushing of liquid purification means with a liquid medium, followed by resuming the liquid purification, wherein during said cycle, raw liquid is routed through a raw liquid feed line into a liquid purification unit, in which raw liquid is supplied to the liquid purification means through a pressure increasing means; after the liquid purification means, purified liquid enters a purified liquid line. Drain liquid is supplied after the liquid purification means to a drain discharge line, the most of the drain liquid being discharged into drain through a restrictor. The remaining so portion of the drain liquid is routed, through a recirculation line connected to the drain discharge line, to the raw liquid feed line to be mixed with raw liquid, and the resulting mixture is supplied again through the pressure increasing means to the liquid purification means. Then, upon a predetermined period of time, the liquid purification process is interrupted for flushing the liquid purification means with a is liquid medium intended to remove contaminants built up on the surface of the liquid purification means during the liquid purification process. After the liquid purification means, the liquid medium is discharged into drain via a flushing line connected a drain discharge line, via an open flushing valve mounted on the flushing line.

The liquid purification method including flushing of liquid purification means has a number of disadvantages.

Raw liquid is used as the liquid medium in the flushing of the liquid purification means. As mentioned in the description, the time for liquid purification substantially exceeds the time for flushing of the liquid purification means. In the liquid purification process, a thin polarizing contamination layer builds up on the surface of the membrane, which attracts larger particles and causes clogging and shortening the life of the liquid purification means, and as a result, of the whole system. In the liquid purification process, most of the drain liquid is discharged into drain, only a small portion thereof being recirculated.

A liquid purification method, most closely related to the present invention, can be implemented in a liquid purification system disclosed in International Application WO 2002/055182 (B01D 61/00, TEKNOWSMARTZ, INNOVATIONS/TECHNOLOGY INC., US, publ. Sep. 1, 2001). The liquid purification method involves at least one automatically initiated liquid purification cycle comprising purification of raw liquid and flushing of liquid purification means with a liquid medium, followed by resuming the purification of the liquid; wherein in the course of the cycle, raw liquid is fed into a liquid purification unit, in which the raw liquid is supplied into a liquid purification means through a pressure increasing means; after the liquid purification means, purified liquid is supplied to a purified liquid line. Drain liquid is fed through a recirculation line, via a liquid velocity increasing means, to be mixed with raw liquid in the raw liquid feed line; the resulting mixture is then fed into the liquid purification means. Upon a predetermined period of time, the liquid purification process is interrupted to flush the liquid purification means with a liquid medium intended to remove contaminants built up on the inside surface of the liquid purification means during the liquid purification process, and after the liquid purification means the liquid medium is discharged with a high velocity into drain through a drain discharge line with a drain discharge valve open.

In the liquid purification system according to International Application WO 2002/055182 (B01D 61/00, TEKNOWSMARTZ, INNOVATIONS/TECHNOLOGY INC., US) a purified liquid unit is connected to the purified liquid line and comprises a purified liquid accumulation and disinfection tank connected to pressure increasing means. The pressure increasing means is connected to a purified liquid reservoir in the form of a water-air tank intended to supply purified liquid to consumer and to supply purified liquid to the filtration unit for additional flushing of the liquid purification means with purified liquid.

The method according to International Application WO 2002/055182 (B01D 61/00, TEKNOWSMARTZ, INNOVATIONS/TECHNOLOGY INC., US), comprises flushing of liquid purification means, in which raw liquid is used as a liquid medium.

When the liquid purification means is flushed with raw liquid, the raw liquid is supplied through the raw liquid feed line to the fluid velocity increasing means in the form of a circulation pump mounted in the recirculation line, and further to the liquid purification means, after which liquid is supplied to the drain liquid line and is discharged from the system through a drain discharge valve open. During flushing the liquid purification means with raw liquid the pressure increasing means is deactivated. Flushing of the liquid purification means with raw liquid is accomplished until the concentration of contaminants reaches a predetermined level, and then the liquid purification process is resumed.

The liquid purification method according to International Application WO 2002/055182 (B01D 61/00, TEKNOWSMARTZ, INNOVATIONS/TECHNOLOGY INC., US) enables additional flushing of liquid purification means with purified liquid. The flushing can be carried out irrespective of flushing the purification means with raw liquid.

Additional flushing of liquid purification means with purified liquid is performed after filling the purified liquid tank to a predetermined level. Purified liquid contained in the purified liquid tank, such as a water-air tank, is routed through a line for supplying purified liquid to the recirculation line, and then it is discharged into drain via the liquid purification means through the drain discharge line via the drain discharge valve open. While purified liquid is taken from the water-air tank, the tank is refilled with purified liquid, which is supplied via the pressure increasing means from a purified liquid accumulation and disinfection tank. As soon as the level of purified liquid in the purified liquid accumulation and disinfection tank drops to a predetermined level, the liquid purification process is resumed. During flushing the system with purified liquid, the pressure increasing means and the liquid velocity increasing means are disconnected.

The above liquid purification method has a number of disadvantages. For example, a quite large amount of the raw liquid is to be spent for flushing the liquid purification means. In addition, purified liquid is used in additional flushing of the liquid purification means. To accomplish the liquid purification method, it is necessary that both the liquid increasing pressure means and the liquid velocity increasing means were operating simultaneously, which increases power consumption.

SUMMARY

The object and technical effect attained by the invention is to provide a novel liquid purification method that can reduce the amount of raw liquid used and simultaneously reduce the amount of contaminants on liquid purification means, thereby extending the life of liquid purification means.

The object and the required technical effect are attained in a liquid purification method comprising at least one automatically initiated liquid purification cycle involving purification of a raw liquid and flushing of a liquid purification means with a liquid medium, followed by resuming the purification of liquid; wherein in the course of the cycle the raw liquid is routed through a raw liquid feed line to a liquid purification unit, in which the raw liquid is supplied via a pressure increasing means through a raw liquid/drain liquid mixing line to the liquid purification means; downstream of the liquid purification means the purified liquid enters a purified liquid line, and the drain liquid is supplied through a recirculation line to be mixed with raw liquid, and the resulting mixture flows to the liquid purification means, and then, after a predetermined period of time, the liquid purification process is interrupted for flushing the liquid purification means with a liquid medium intended to remove contaminants built up on the inside surface of the liquid purification means in the process of liquid purification; downstream of the liquid purification means the liquid medium is discharged with a high velocity into drain through a drain discharge line with a drain discharge valve open, wherein according to the invention, during said at least one liquid purification cycle, prior to flushing the liquid purification means with a liquid medium, the liquid purification process is interrupted at least once for a short period of time sufficient for flushing the liquid purification means with the drain liquid and raw liquid mixture, at which a polarizing contamination layer built up on the inside surface of the liquid purification means is destroyed, and the liquid purification process is resumed after each short flushing of the liquid purification means, and the raw liquid/drain liquid mixture is used as the liquid medium in said flushing of the liquid purification means with a liquid medium, the duration of which exceeds that of the at least one flushing of the liquid purification means, at which the polarizing layer built up on the surface of the liquid purification means is destroyed; wherein said short flushing of the liquid purification means, at which the polarizing contamination layer built up on the inside surface of the liquid purification means is destroyed, and said flushing of the liquid purification means with the liquid medium are performed with the pressure increasing means activated; wherein in the liquid purification unit, downstream of the pressure increasing means, prior to supplying to the liquid purification means through the raw liquid/drain liquid mixing line, the raw liquid is routed into a liquid mixing device adapted to accumulate pressure, then the raw liquid is routed through the raw liquid/drain liquid mixture supply line connected to the liquid mixing device, via an additional pressure increasing means mounted thereon, into the liquid purification means; then the purified liquid is supplied to the purified liquid line, and through the purified liquid supply means to consumer, and drain liquid is supplied through the recirculation line connected to the drain liquid outlet of the liquid purification means to the raw liquid/drain liquid mixing line, and further to the liquid mixing device; wherein during said flushings of the liquid purification means the velocity of the raw liquid/drain liquid mixture flow from the mixing device in the raw liquid/drain liquid mixture supply line through an additional pressure increasing means to the liquid purification means is increased, and then the raw liquid/drain liquid mixture is discharged into drain through the drain discharge valve open; wherein during one filtration cycle, upon completion of liquid purification, prior to flushing the liquid purification means with a liquid medium, the raw liquid/drain liquid mixture is removed from the liquid mixing device at the closed valve in the raw liquid feed line and the open valve in the drain discharge line, which is routed through an additional pressure increasing means to the liquid purification means, and then discharged into drain through the drain discharge line with the drain discharge valve open; wherein in the process of liquid purification process in the liquid purification unit the raw liquid is routed, through a pressure increasing means mounted in the raw liquid/drain liquid mixing line, through the raw liquid/drain liquid mixing line into the liquid purification means; then the purified liquid is supplied through the purified liquid line into a purified liquid accumulation cavity of a liquid-liquid tank, and drain liquid is recycled through a recirculation line into a displacement cavity of the liquid-liquid tank; and as the accumulation cavity is filled with purified liquid, the displaced liquid from the displacement cavity is supplied to the raw liquid/drain liquid mixing line, and upon opening the purified liquid supply means the purified liquid is supplied from the cavity through the purified liquid line to consumer; wherein at said short flushing of the liquid purification means, at which the polarizing contamination layer built up on the inside surface of the liquid purification means is destroyed, and at said flushing of the liquid purification means with a liquid medium, the raw liquid/drain liquid mixture is supplied to the drain discharge line simultaneously through the raw liquid/drain liquid mixing line through the liquid pressure increasing means and the liquid purification means, and through the recirculation line from the displacement cavity of the liquid-liquid tank.

DETAILED DESCRIPTION

Figure 1:
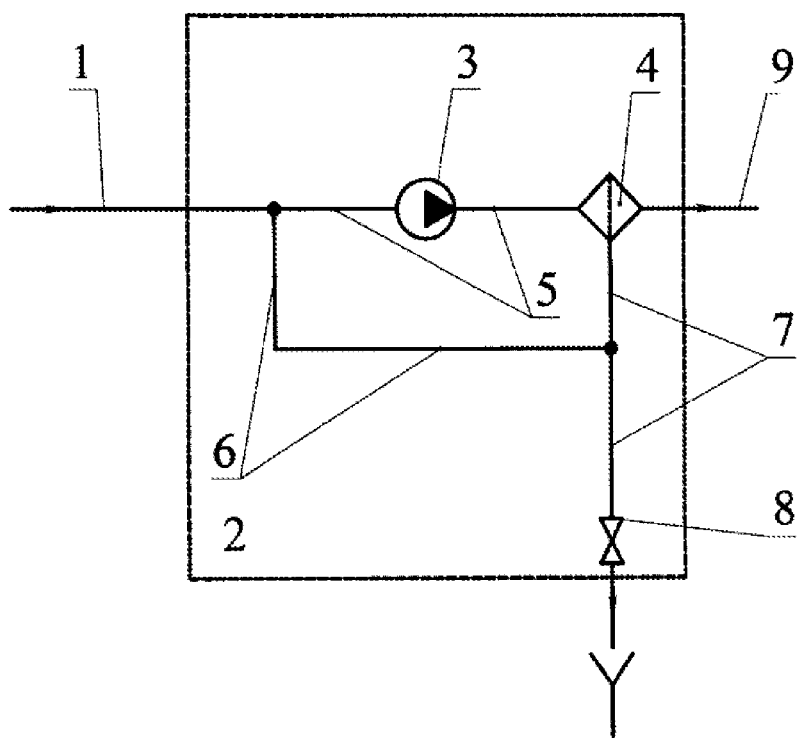
FIG. 1 shows a flowchart of the liquid purification method.

According to a liquid purification method (FIG. 1), purification of raw liquid is accomplished in the following manner. Raw liquid is fed through a raw liquid feed line (1) into a liquid purification unit (2), wherefrom the raw liquid is routed through a raw liquid/drain liquid mixing line (5), via a pressure increasing means (3), to a liquid purification means (4). The pressure increasing means can be, but not limited to, in the form of a membrane (diaphragm) pump (FIGS. 1 and 3). In this case, a flow restrictor is mounted in a recirculation line (6) (not shown in FIGS. 1 and 3). Alternatively, the system (FIG. 2) can be equipped with a pressure increasing means (3) in the form of a membrane (diaphragm) pump mounted in the raw liquid feed line and an additional pressure increasing device (13) in the form of a circulating pump mounted in a raw liquid/drain liquid supply line (16). Downstream of the liquid purification means (4), drain liquid is supplied through the recirculation line (6) to the raw liquid/drain liquid mixing line (5) and via the pressure increasing means (3) to the liquid purification means (4). After the liquid purification means (4), purified liquid is fed to the purified liquid line (9).

After a predetermined time, the liquid purification process is interrupted for a short time sufficient for flushing the liquid purification means (4), during which the polarizing layer on the inside surface of the liquid purification means (4) is destroyed by the raw liquid/drain liquid mixture. At the same time, the valve (8) is opened in the drain discharge line (7) and the mixture of raw liquid entering through the raw liquid line into the liquid cleaning unit via the pressure increasing means (3), and drain liquid formed after completion of the filtering process is routed to the liquid purification means (4), and further through the drain discharge line (7) via the valve (8) open is discharged from the system. The raw liquid/drain liquid mixture, passing over the inside surface of the liquid purification means (4), destroys the thin polarizing layer built up on the inside surface of the liquid purification means (4). Upon completion of short flushing, the valve (8) on the drain discharge line (7) is closed and the liquid purification process is resumed. Such alternation of purification process and short flushings of the liquid purification means (4) is carried out before flushing the liquid purification means (4) with a liquid medium a predetermined number of times, depending on the rate of contamination of the raw liquid. In the short flushing of the liquid purification means (4), pressure at the purified liquid outlet in the liquid purification means will be substantially lower than pressure in the purified liquid line (9). Furthermore, in contrast to the purified liquid line (9), the liquid purification means (4) comprises contaminants. Owing to the higher pressure on the purified liquid side in the absence of contaminants, a direct osmosis phenomenon occurs, at which the purified liquid can penetrate into the liquid purification means (4). However, the amount of purified liquid penetrating into the liquid purification means (4) will be negligible due to a check valve (Ok) mounted in the purified liquid line (9). But this amount of purified liquid is sufficient to further increase the velocity of liquid flowing through the liquid purification means (4).

Then flushing of the liquid purification means (4) with a liquid medium is performed, in which raw liquid/drain liquid mixture is used as the liquid medium. Duration of this flushing is longer than that of the at least one short flushing of the liquid purification means described above. In the process of flushing of the liquid purification means (4) with a liquid medium, the valve (8) on the drain discharge line (7) is open and the mixture of the raw liquid flowing through the raw liquid line into the liquid purification unit via the pressure increasing means (3), and the drain liquid formed upon completion of the filtration process is routed to the liquid purification means (4), and then, through the drain discharge line (7), via the open valve (8) is discharged from the system. Since the duration of flushing of the liquid purification means (4) with a liquid medium exceeds that of at least one short flushing, the amount of raw liquid supplied to be mixed with drain liquid will be greater than the amount of raw liquid supplied for mixing during the short flushing. Consequently, in the flushing of the liquid purification means (4) with a liquid medium the concentration of contaminants in the raw liquid/drain liquid mixture will reduce.

Once flushing of the liquid purification means (4) with a liquid medium is completed, the valve (8) on the drain discharge line (7) is closed, and liquid purification process is resumed.

Figure 2:
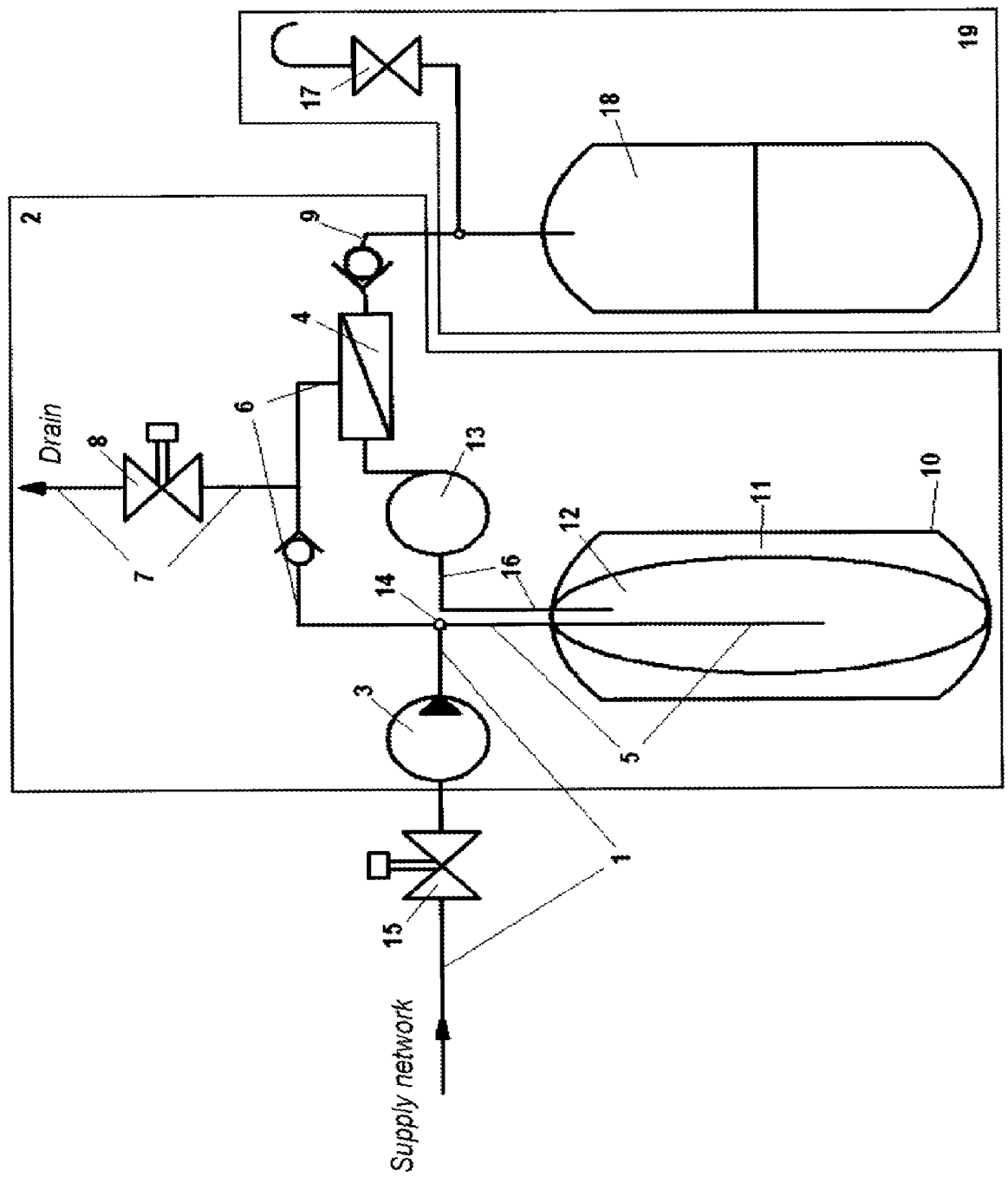
FIG. 2 shows a schematic diagram of a system for implementing the liquid purification method, comprising a mixing device in the form of a pressure tank with a cavity for mixing raw liquid with drain liquid and a cavity for compressible medium.
Figure 3:
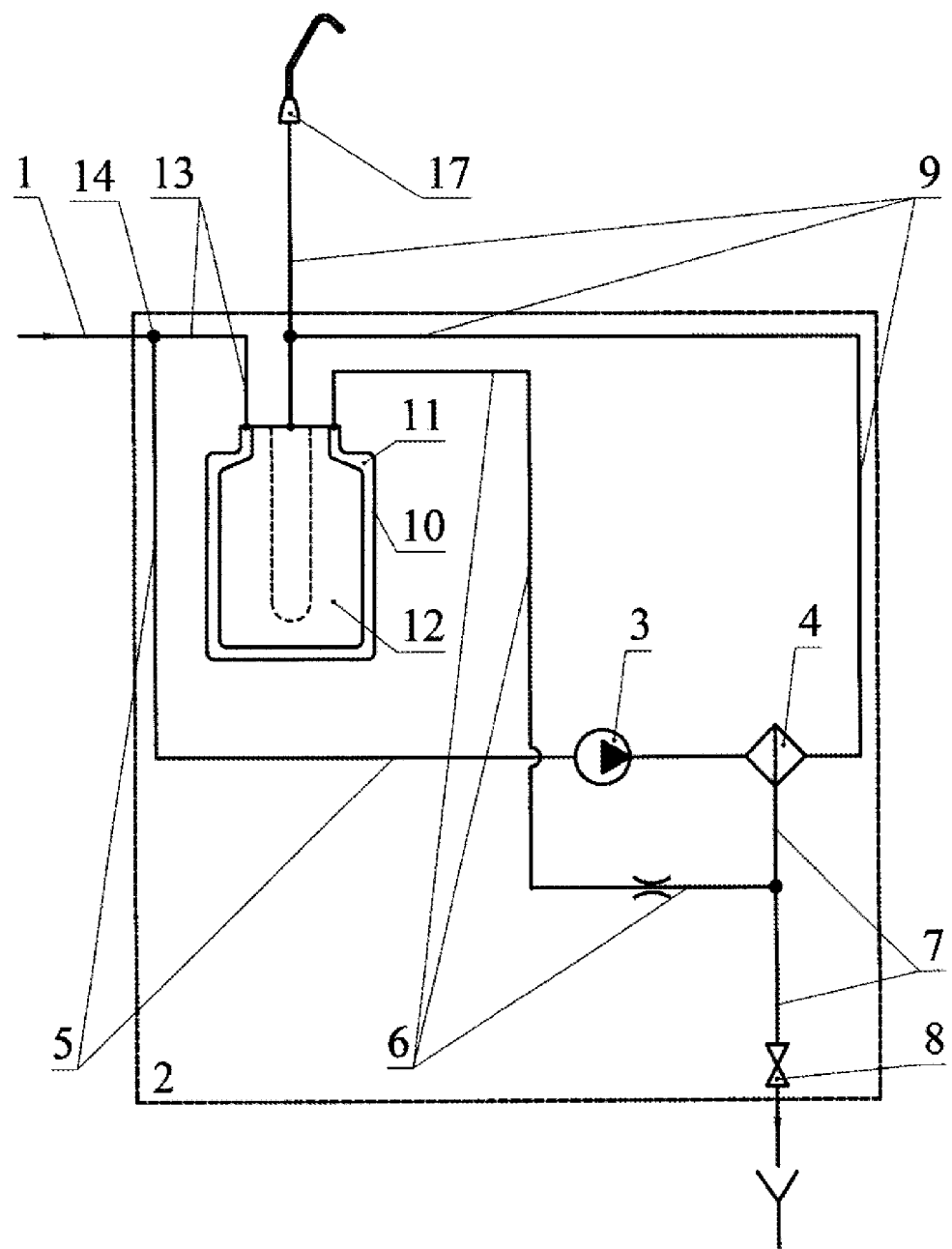
FIG. 3 shows a schematic diagram of a system for implementing the liquid purification method, comprising a liquid accumulation reservoir of liquid-liquid type, which comprises a purified liquid accumulation cavity and a drain liquid displacement cavity.

The liquid purification method described above can be applied to various systems designed for its implementation, for example, the systems shown in FIGS. 2 and 3. In the systems described below, a liquid mixing device (10) (FIG. 2) and a purified liquid accumulation tank (18) (FIG. 3) are connected to the recirculation line (6) to increase the amount of liquid flowing through the recirculation line (6).

According to a liquid purification method (FIG. 2), purification of raw liquid is accomplished as follows. Raw liquid is fed through a raw liquid feed line (1) via an open valve (15) mounted thereon into a liquid purification unit (2). In the liquid purification unit (2), the raw liquid is routed via a pressure increasing means (3) mounted in the raw liquid feed line (1) to a line (5) for mixing the raw liquid with drain liquid formed in the liquid purification process, and further to a liquid mixing device (10). The liquid mixing device (10) is a pressure tank, the inner space of which is separated by a flexible partition into a cavity (11) filled with a compressible medium, e.g. air, and a cavity (12) for mixing raw and drain liquids. After the liquid mixing device (10), raw liquid is routed to the raw liquid/drain liquid mixture supply line (16), and then, via an additional pressure increasing means (13) mounted in the raw liquid/drain liquid mixture supply line (16), the raw liquid is supplied into the liquid purification means (4). After the liquid purification means (4), purified liquid is fed to the purified liquid line (9). Through the purified liquid line (9), the purified liquid is routed to a purified liquid unit (19). In the purified liquid unit (19), purified liquid is supplied to an accumulation tank (18) or, via an open purified liquid supply means (17), to consumer.

Drain liquid is fed after the liquid purification means (4) to the recirculation line (6) and, via a connection unit (14), to the raw liquid/drain liquid mixing line (5). At the same time, raw liquid in the raw liquid feed line (1) is kept being routed via the pressure increasing means (3) and the connection unit (14) to the raw liquid/drain liquid mixing line (5). Further, the resulting raw liquid/drain liquid mixture is fed into a cavity (12) of the liquid mixing device (10). In the cavity (12) of the liquid mixing device (10) the raw and drain liquids are additionally mixed, so the mixture entering through the raw liquid/drain liquid mixture supply line (16) into the liquid purification means (4) is more homogeneous.

Flushing of the liquid purification means (4) with the raw liquid/drain liquid mixture in the amount not exceeding the amount of liquid in the liquid purification means (4) is carried out as follows. A drain discharge valve (8) on the drain discharge line (7) is opened, while the supply of raw liquid to the raw liquid feed line (1) to the liquid purification unit (2) is not interrupted. The raw liquid/drain liquid mixture is routed through a mixing cavity (12) with a velocity higher than that of liquid medium at flushing of the liquid cleaning means (4) with a liquid medium, through the raw liquid/drain liquid mixture line (16), via a liquid velocity increasing device (13) to the liquid purification means (4), and then is discharged into drain through the drain discharge line (7) with the drain discharge valve (8) open. The raw liquid/drain liquid mixing device (10) is intended to accumulate pressure. At short flushing, when the drain discharge valve (8) is closed, the liquid purification means (4) is subject to hydraulic impacts caused by pressure surge in the system. Pressure is accumulated in the raw liquid/drain liquid mixing device (10) disposed downstream of the pressure increasing means (3). Raw liquid is supplied through the raw liquid feed line (1), via the pressure increasing means (3) in pressurized state to a raw liquid/concentrate mixing cavity (12). Since the cavity (11) comprises a compressible medium, pressure in the cavity (11) will increase as the cavity (12) is filled with liquid. Upon opening the valve (8) on the drain discharge line (7) the raw liquid/drain liquid mixture acquires a high velocity due to the counter pressure of the cavity (11) and the cavity (12). Upon closing the valve (8) in the drain discharge line (7), the pressure accumulated in the mixing device (10) will decrease the hydraulic impact in the liquid cleaner (4).

During one filtration cycle, upon completion of liquid purification, before flushing the liquid purification means (4) with a liquid medium, drain liquid is removed from the liquid mixing device (10). The process is carried out as follows. At the same time, the valve (15) in the raw liquid feed line (1) is closed, the pressure increasing means (3) is deactivated, and the valve (8) on the drain discharge line (7) is opened. Drain liquid is routed from the cavity (12) of the raw liquid/drain liquid mixing device (10) through the raw liquid/drain liquid mixture supply line (16), via the liquid velocity increasing means (13), to the liquid purification means (4), and further, through the drain discharge line (7) with the drain discharge valve open (8), is discharged into drain.

After removal of drain liquid from the raw liquid/concentrate mixing device (10), the liquid purification means (4) is flushed with a liquid medium, which is the raw liquid/drain liquid mixture. During the flushing process, simultaneously, the liquid velocity increasing means (13) is activated, the valve (15) in the raw liquid feed line (1) and the valve (8) in the drain discharge line (7) are opened. Raw liquid is fed through the raw liquid feed line (1) to the liquid purification unit (2) via the pressure increasing means (3). In the liquid purification unit (2), raw liquid is mixed with the drain liquid remaining in the system. The resulting mixture is fed via the raw liquid/drain liquid mixing device (10), through the raw liquid/drain liquid mixture supply line (16), via the fluid velocity increasing device and the liquid purification means (4) to the drain discharge line (7), and is discharged into drain with the valve (8) open.

Upon completion of flushing of the liquid purification means (4) with a liquid medium, liquid purification process is resumed.

According to a liquid purification method (FIG. 3), purification of raw liquid is accomplished as follows. Raw liquid is fed through a raw liquid feed line (1) into a filtration unit (2). In the filtration unit (2), the raw liquid feed line (1) is connected through a connection unit (14) to a raw liquid and concentrate mixing line (5) and a secondary line (13) connected to a displacement cavity (11) of a liquid-liquid tank (10). In the filtration unit (2), raw liquid is routed through the secondary line (13) to the displacement cavity (11) of the liquid-liquid tank (10), and simultaneously through a raw liquid/drain liquid mixing line (5), via a pressure increasing means (3), to liquid purification means (4). After the liquid purification means (4), the purified liquid is supplied through a purified liquid line (9) to a purified liquid accumulation cavity (12) for the liquid-liquid tank (10). After the liquid purification means (4), drain liquid is supplied through a recirculation line (6) connected to a drain discharge line (7) to a drain liquid displacement cavity (11) of the liquid-liquid tank (10). Drain liquid entering the displacement cavity (11) replaces the raw liquid contained in the cavity (11). As the accumulation cavity (12) is filled with liquid, drain liquid will flow from the displacement cavity (11) through the secondary line (13), via the connection unit (14), into the raw liquid/drain liquid mixing line (5) and via the pressure increasing means (3) to the liquid purification means (4). When the purified liquid supply means (17) connected to the purified liquid line (9) is opened, the purified liquid is supplied to consumer.

In the system shown in FIG. 3, which enables implementing the described liquid purification method, at the flushing of the liquid purification means (4), in which the polarizing contamination layer built up on the inside surface of the liquid purification means (4) is destroyed, and at the flushing of the liquid purification means (4) with a liquid medium, the raw liquid/drain liquid mixture is supplied to the drain discharge line (7) in the following manner. During flushing of the liquid purification means (4), the liquid purification process is interrupted, and drain liquid does not flow through the recirculation line (6) into the displacement cavity (11). When the valve (8) in the drain discharge line (7) is opened, the raw liquid/drain liquid mixture is supplied through the raw liquid/drain liquid mixing line (5), via the pressure increasing means (3) and the liquid purification means (4), to the drain discharge line, and, at the same time, drain liquid from the displacement cavity (11) enters through the recirculation line (6) into the drain discharge line (7). The two liquid flows are joined in the drain discharge line (7) and discharged from the system through the open valve (8).

As stated earlier, the present liquid purification method reduces the amount of raw liquid used, and at the same time reduces the amount of contaminants on the liquid purification means and extends the life of the purification means.

In contrast to the most closely related prior art method, only raw liquid/drain liquid mixture is used for flushing the liquid purification means. Destruction of the polarizing layer built up on the inside surface of the liquid purification means occurs during flushing the liquid purification means with the raw liquid/drain liquid mixture in the amount not exceeding the amount of liquid in the liquid purification means. This reduces the amount of liquid (raw liquid/drain liquid mixture) discharged into drain, and hence the amount of raw liquid used to flush the liquid purification means. The flushing of the liquid purification means with a liquid medium is also carried out with raw liquid/drain liquid mixture, and duration of such flushing exceeds that of the flushing which causes destruction of the polarizing layer. However, the total amount of raw liquid/drain liquid used in short and long flushings of the liquid purification means according to the present liquid purification method is less than the total amount of raw liquid used in flushing of the liquid purification means in the most closely related prior art method. Furthermore, the most closely related method uses purified liquid in the additional flushing. According to the present liquid purification method, the total amount of purified liquid is supplied to consumer.

The description represents a preferred embodiment of the invention. Various modifications can be made in the invention without departing from the scope of claims, thereby enabling its wide use.

The invention claimed is:
1. A liquid purification method comprising:
  at least one automatically initiated liquid purification cycle involving purification of a raw liquid and flushing of a liquid purification device with a liquid medium, followed by resuming purification of liquid;
  routing the raw liquid through a raw liquid feed line, where the raw liquid is supplied via a pressure increasing means through a raw liquid/drain liquid mixture supply line to the liquid purification device;

downstream of the liquid purification device, purified liquid from the liquid purification device entering a purified liquid line, and supplying drain liquid through a recirculation line to be mixed with the raw liquid to create a drain liquid/raw liquid mixture that flows to the liquid purification device;

then, after a period of time, interrupting the liquid purification cycle for flushing the liquid purification device with the liquid medium intended to remove contaminants built up on an inside surface of the liquid purification device during liquid purification;

downstream of the liquid purification device, discharging the liquid medium into a drain through a drain discharge line with a drain discharge valve open;

during said at least one liquid purification cycle, prior to flushing the liquid purification device with the liquid medium, interrupting the purification of the raw liquid at least once for a period of time sufficient for a first flushing of the liquid purification device with the drain liquid/raw liquid mixture to destroy a polarizing contamination layer built up on the inside surface of the liquid purification device, and resuming the liquid purification cycle after each first flushing of the liquid purification device; and using the raw liquid/drain liquid mixture as the liquid medium in a second flushing of the liquid purification device for a duration longer than that of the first flushing of the liquid purification device to destroy the polarizing contamination layer.

2. The liquid purification method according to claim 1, further comprising performing said first flushing and said second flushing with the pressure increasing means activated.

3. The liquid purification method according to claim 1, further comprising:
   downstream of the pressure increasing means, prior to supplying to the liquid purification device through the raw liquid/drain liquid mixture supply line, routing the raw liquid into a liquid mixing device adapted to accumulate pressure,
   then routing the raw liquid through the raw liquid/drain liquid mixture supply line connected to the liquid mixing device, via an additional pressure increasing means mounted thereon, into the liquid purification device;
   then supplying the purified liquid to the purified liquid line, and supplying the drain liquid through the recirculation line connected to the drain discharge line of the liquid purification device to the raw liquid/drain liquid mixture supply line, and further to the liquid mixing device.

4. The liquid purification method according to claim 3, further comprising during said first and second flushings of the liquid purification device, increasing velocity of the raw liquid/drain liquid mixture flow from the liquid mixing device in the raw liquid/drain liquid mixture supply line through the additional pressure increasing means to the liquid purification device, and then discharging the raw liquid/drain liquid mixture into the drain through a drain discharge valve that is open.

5. The liquid purification method according to claim 4, further comprising during one of the at least one automatically initiated liquid purification cycle, upon completion of liquid purification, prior to the first flushing of the liquid purification device, removing the raw liquid/drain liquid mixture from the liquid mixing device with a closed valve in the raw liquid feed line and the drain discharge valve that is open in the drain discharge line, where the raw liquid/drain liquid mixture is routed through the additional pressure increasing means to the liquid purification device and then discharged into the drain through the drain discharge line with the drain discharge valve open.

6. The liquid purification method according to claim 1, further comprising:
   in the liquid purification cycle, routing the raw liquid, via the pressure increasing means mounted on the raw liquid/drain liquid mixture supply line, through the raw liquid/drain liquid mixture supply line into the liquid purification device;
   then supplying the purified liquid through the purified liquid line into a purified liquid accumulation cavity of a liquid-liquid tank, and recycling the drain liquid through the recirculation line into a displacement cavity of the liquid-liquid tank; and
   as the purified liquid accumulation cavity is filled with the purified liquid, supplying displaced liquid from the displacement cavity to the raw liquid/drain liquid mixture supply line, and upon opening a purified liquid supply line, supplying the purified liquid from the purified liquid accumulation cavity through the purified liquid line to consumer.

7. The liquid purification method according to claim 6, further comprising during the first flushing of the liquid purification device, at which the polarizing contamination layer built up on the inside surface of the liquid purification device is destroyed, and at said second flushing of the liquid purification device with the liquid medium, supplying the raw liquid/drain liquid mixture to the drain discharge line simultaneously through the raw liquid/drain liquid mixture supply line through the pressure increasing means and the liquid purification device and through the recirculation line from the displacement cavity of the liquid-liquid tank.

\* \* \* \* \*